US011482222B2

(12) United States Patent
Regan et al.

(10) Patent No.: US 11,482,222 B2
(45) Date of Patent: Oct. 25, 2022

(54) DYNAMICALLY ASSIGNING WAKE WORDS

(71) Applicant: MOTOROLA SOLUTIONS, INC., Chicago, IL (US)

(72) Inventors: Sean Regan, Boca Raton, FL (US); Maryam Eneim, Boca Raton, FL (US); Melanie King, Hollywood, FL (US); Manoj Prasad Nagendra Prasad, Boca Raton, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 169 days.

(21) Appl. No.: 16/817,445

(22) Filed: Mar. 12, 2020

(65) Prior Publication Data

US 2021/0287670 A1 Sep. 16, 2021

(51) Int. Cl.
| | |
|---|---|
| *G10L 15/22* | (2006.01) |
| *H04W 4/029* | (2018.01) |
| *H04W 4/90* | (2018.01) |
| *H04W 4/80* | (2018.01) |
| *G10L 15/06* | (2013.01) |
| *G10L 15/187* | (2013.01) |
| *H04L 67/50* | (2022.01) |
| *G10L 15/08* | (2006.01) |

(Continued)

(52) U.S. Cl.
CPC .............. *G10L 15/22* (2013.01); *G10L 15/06* (2013.01); *G10L 15/187* (2013.01); *H04L 67/535* (2022.05); *H04W 4/029* (2018.02); *H04W 4/80* (2018.02); *H04W 4/90* (2018.02); *G10L 25/51* (2013.01); *G10L 25/54* (2013.01); *G10L 2015/088* (2013.01)

(58) Field of Classification Search
None
See application file for complete search history.

(56) References Cited

U.S. PATENT DOCUMENTS

| 9,263,042 B1 * | 2/2016 | Shariﬁ | G06F 3/167 |
| 9,275,637 B1 | 3/2016 | Salvador et al. | |
| 9,373,321 B2 | 6/2016 | Bapat et al. | |

(Continued)

OTHER PUBLICATIONS

International Search Report and Written Opinion for Application No. PCT/US2021/018701 dated Jun. 8, 2021 (13 pages).

*Primary Examiner* — Richard Z Zhu
(74) *Attorney, Agent, or Firm* — Michael Best & Friedrich LLP

(57) ABSTRACT

A method and apparatus for determining a unique wake word for devices within an incident. One system includes an electronic computing device comprising a transceiver and an electronic processor communicatively coupled to the transceiver. The electronic processor is configured to receive a notification indicative of an occurrence of an incident and one or more communication devices present at the incident, determine contextual information associated with the incident and the one or more communication devices, and identify one or more wake words based on the contextual information. The electronic processor is further configured to determine a phonetic distance for each pair of wake words included in the one or more wake words, and select a unique wake word from the one or more wake words for each communication device of the one or more communication devices based on the determined phonetic distance.

20 Claims, 7 Drawing Sheets

(51) Int. Cl.
  *G10L 25/54* (2013.01)
  *G10L 25/51* (2013.01)

(56) References Cited

U.S. PATENT DOCUMENTS

| | | | |
|---|---|---|---|
| 9,830,908 B2 | 11/2017 | Kwon et al. | |
| 10,027,801 B1* | 7/2018 | Subramanyam | H04W 4/08 |
| 10,102,856 B2* | 10/2018 | Segal | G10L 15/08 |
| 10,424,300 B1 | 9/2019 | Tan et al. | |
| 10,832,662 B2* | 11/2020 | Prasad | G10L 15/08 |
| 11,100,923 B2* | 8/2021 | Fainberg | G10L 15/14 |
| 2004/0199388 A1* | 10/2004 | Armbruster | G10L 15/22 |
| | | | 704/251 |
| 2013/0289994 A1* | 10/2013 | Newman | G10L 15/32 |
| | | | 704/254 |
| 2014/0006825 A1* | 1/2014 | Shenhav | G06F 1/3206 |
| | | | 713/323 |
| 2014/0012586 A1* | 1/2014 | Rubin | G10L 15/06 |
| | | | 704/273 |
| 2016/0293168 A1* | 10/2016 | Chen | G10L 15/22 |
| 2017/0053650 A1* | 2/2017 | Ogawa | G10L 15/063 |
| 2019/0304439 A1* | 10/2019 | Mese | G06F 3/013 |
| 2019/0311720 A1* | 10/2019 | Pasko | G10L 15/32 |
| 2020/0151841 A1* | 5/2020 | Schuler | G06Q 50/265 |
| 2020/0294491 A1* | 9/2020 | Tang | G10L 15/08 |
| 2020/0349924 A1* | 11/2020 | Stoimenov | G10L 15/187 |
| 2021/0158803 A1* | 5/2021 | Knudson | G10L 15/22 |

\* cited by examiner

DYNAMICALLY ASSIGNING WAKE WORDS

BACKGROUND OF THE INVENTION

Communication devices, for example, two-way radios, land mobile radios, smart telephones, etc. are used in many applications throughout many industries. These communication devices may be configured to activate upon receipt (for example, via a microphone and audio processor) of a trigger or wake word. However, when multiple communication devices with similar wake words are in close proximity, a wake word intended for a first communication device may inadvertently trigger activation a second communication device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
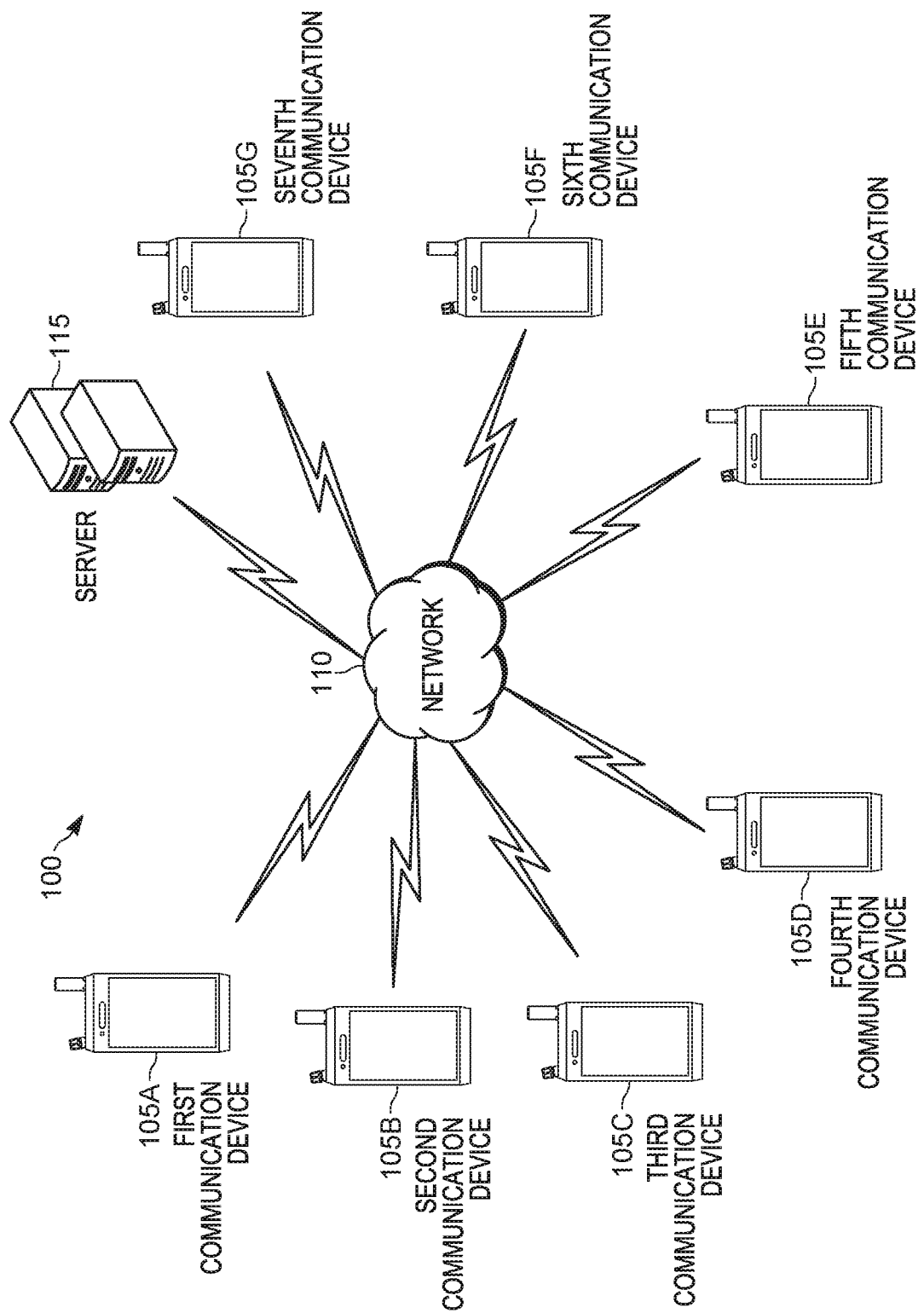
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides an electronic computing device comprising a transceiver and an electronic processor communicatively coupled to the transceiver. The electronic processor is configured to receive a notification indicative of an occurrence of an incident and one or more communication devices present at the incident. The electronic processor is further configured to determine contextual information associated with the incident and the one or more communication devices. The electronic processor is further configured to identify one or more wake words based on the contextual information. The electronic processor is further configured to determine a phonetic distance for each pair of wake words included in the one or more wake words. The electronic processor is further configured to select a unique wake word from the one or more wake words for each communication device of the one or more communication devices based on the determined phonetic distance.

Another embodiment provides a method of determining a wake word. The method comprises receiving, with an electronic processor, a notification indicative of an occurrence of an incident and one or more communication devices present at the incident. The method further comprises determining, with the electronic processor, contextual information associated with the incident and the one or more communication devices. The method also comprises identifying, with the electronic processor, one or more wake words based on the contextual information. The method also comprises determining, with the electronic processor, a phonetic distance for each pair of wake words included in the one or more wake words. The method further comprises selecting a unique wake word from the one or more wake words for each communication device of the one or more communication devices based on the determined phonetic distance.

FIG. 1 is a diagram of a communication system 100 according to one embodiment. The communication system 100 includes a plurality of communication devices. In the example illustrated in FIG. 1, a first communication device 105A, a second communication device 105B, a third communication device 105C, a fourth communication device 105D, a fifth communication device 105E, a sixth communication device 105F, and a seventh communication device 105G are shown. In the following description, when explaining how a single communication device functions, a reference to communication device 105 is used. It is not necessary, however, that the communication devices 105A through 105G be identical. The communication devices 105A through 105G are merely examples. In some embodiments, the communication systems may include more or fewer communication devices than the number shown in communication system 100 illustrated in FIG. 1.

The communication devices 105A through 105G communicate with each other over a network 110. Parts of the network 110 are wireless, but some parts of the network 110 may be a wired. All or parts of the network 110 may be implemented using various existing networks, for example, a cellular network, a Long Term Evolution (LTE) network, a 3GPP compliant network, a 5G network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 110 may also include future developed networks. In some embodiments, the network 110 may also include a combination of the networks mentioned previously herein. In some embodiments, the communication devices 105A through 105G may communicate directly with each other using a communication channel or connection that is outside of the network 110. For example, the plurality of communication devices 105A through 105G may communicate directly with each other when they are within a predetermined distance from each other.

In some embodiments, the communication system 100 also includes a server 115 that monitors the communication devices 105A through 105G. In some embodiments, the server 115 is a computer maintained, for example, at a call center or public safety command center. In some embodiments, the server 115 controls distribution of wake words to the communication devices 105A through 105G over the network 110 as explained in greater detail below.

Figure 2:
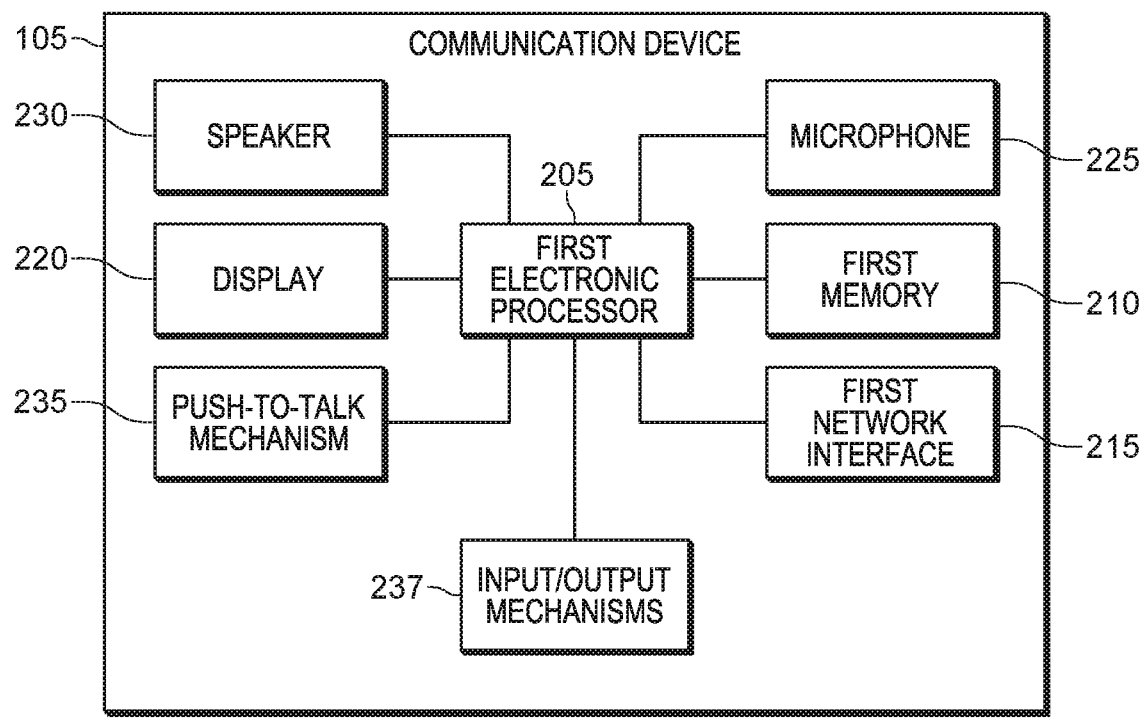
FIG. 2 is a diagram of a communication device included in the communication system of FIG. 1 in accordance with some embodiments.

FIG. 2 is a block diagram of a communication device 105 of the communication system 100 according to one embodiment. In the example shown, the communication device 105 includes a first electronic processor 205 (for example, a microprocessor or another electronic device). The first electronic processor 205 may be electrically connected to a first memory 210, a first network interface 215, a display 220, a microphone 225, a speaker 230, a push-to-talk mechanism 235, and other input and output mechanisms 237. In some embodiments, the communication device 105 may include fewer or additional components in configurations different from that illustrated in FIG. 2. For example, in some embodiments, the communication device 105 also includes a camera and a location component (for example, a global positioning system receiver). In some embodiments, the communication device 105 performs additional functionality than the functionality described below.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 sends and receives data to and from the network 110. For example, the first network interface 215 may include a transceiver for wirelessly communicating with the network 110. Alternatively or in addition, the first network interface 215 may include a connector or port to establish a wired connection to the network 110. The wired connection may be created, for example, via an Ethernet cable. The first electronic processor 205 receives electrical signals representing sound from the microphone 225 and may communicate information related to the electrical signals over the network 110 through the first network interface 215. The information may be intended for receipt by another communication device 105. Similarly, the first electronic processor 205 may output data received from the network 110 through the first network interface 215, for example, as from another communication device 105, through the speaker 230, the display 220, or a combination thereof. For example, an assigned wake word may be provided via an output device, for example, speaker 230, the display 220, a haptic device (not shown), or the like.

In some embodiments, the push-to-talk mechanism 235 allows a user of the communication device 105 to initiate communication over the network 110. For example, when the first electronic processor 205 detects that the push-to-talk mechanism 235 is enabled, the first electronic processor 205 communicates sound data detected by the microphone 225 over the network 110 (for example, as a half-duplex communication signal). In some embodiments, the sound data is communicated to other communication devices that are affiliated with a talk group to which the communication device 105 is broadcasting. When the first electronic processor 205 detects that the push-to-talk mechanism 235 is no longer enabled (for example, has been released), the first electronic processor 205 stops the communication of the sound data. In some embodiments, the push-to-talk mechanism 235 may be a mechanical button or knob or a virtual button or knob displayed on the display 220, which may include a touchscreen. In some embodiments, the push-to-talk mechanism 235 may be a mechanical button or knob on an accessory that is separate from and communicates with the communication device 105 (for example, a button or knob on a remote speaker-microphone).

In some embodiments, the communication device 105 only permits a user of the communication device 105 to initiate an action, such as communication over the network 110, following the receipt of a wake word. For example, the communication device 105 may enter a restriction state upon receiving an initial communication signal from the push-to-talk-mechanism 235. When in the restriction state, the communication device 105 disables or ignores the transmission and receipt of signals. In some embodiments, signals received while the communication device 105 is in the restriction state are initially ignored, but nonetheless stored in the first memory 210. When the device receives the wake word using the microphone 225, the communication device 105 enters a communication mode. In some embodiments, the communication device 105 receives the wake word via a keyboard, or another form of input. In the communication mode, the communication device 105 transmits and receives signals using the first network interface 215. In some embodiments, the communication device stores signals received while in the restriction mode. These stored signals may be accessed later. For example, when the communication device switches to the communication mode, previously stored signals may be output or otherwise provided to a user after the communication device 105 receives a user request via an input mechanism.

Figure 3:
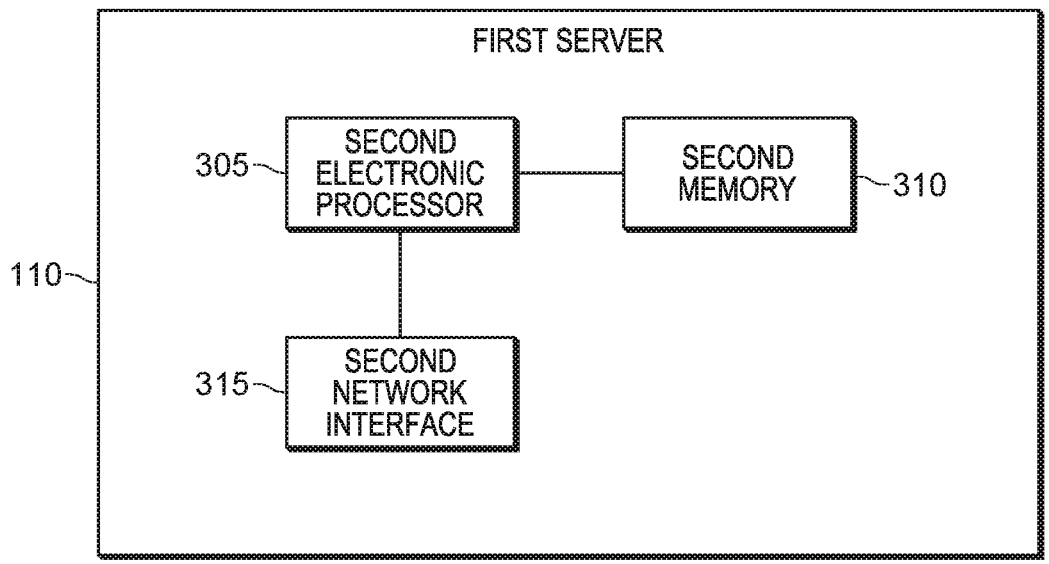
FIG. 3 is a diagram of a server included in the communication system of FIG. 1 in accordance with some embodiments.

FIG. 3 is a block diagram of the server 115 according to one embodiment. In the example illustrated, the server 115 is a computer that includes a second electronic processor 305, an input/output interface (not shown), a second memory 310, and a second network interface 315. These components are similar to those described above with respect to the communication device 105 and perform similar functions, but need not be identical. As noted previously herein, in some embodiments, the server 115 monitors the communication devices 105 by receiving characteristics of the communication devices 105 (for example, battery level, communication mode status, assigned wake word, and the like) from the communication devices 105 through the second network interface 315. In some embodiments, characteristics of the communication devices 105 are stored in the second memory 310 by the second electronic processor 305.

For example, the second memory 310 may store which communication devices 105 are assigned specific wake words. For example, first communication device 105A may be assigned the wake word "Alpha", the second communication device 105B may be assigned the wake word "Bravo", the third communication device 105C may be assigned the wake word "Charlie", and so on. The second memory 310 may also store a list of all potential wake words that may be assigned to the communication devices 105A through 105G. The second memory 310 may also store a list of all wake words not assigned to the communication devices 105A through 105G.

In some embodiments, the server 115 assigns specific, or unique, wake words to the communication devices 105A through 105G. For example, communication device 105A arrives at an incident (or an incident scene) alongside the second communication device 105B and the third communication device 105C. The second electronic processor 305 assigns the wake word "Alpha" to the first communication device 105A, the wake word "Bravo" to the second communication device 105B, and the wake word "Charlie" to the third communication device 105C. In some embodiments, the communication device 105 requests a new wake word. For example, after receiving the wake word "Alpha", the first communication device 105A may transmit a signal to the server 115 using the first network interface 215 indicating a request for a new wake word. The server 115 processes this signal and transmits, using the second network interface 315, a new wake word to the first communication device 105A, for example, the wake word "Delta".

In some embodiments, the second memory 310 stores user preferences associated with the communication devices 105A through 105G. For example, the user of communication device 105A may indicate a preference towards the wake words "Alpha" and "Bravo," while indicating a dislike towards the wake words "Charlie" and "Delta". When the word "Alpha" is provided to the user, the user indicates a preference, or that the word is liked. The second electronic processor 305 attaches a classification indicating that "Alpha" is liked to the word, and stores the classification and the word in the second memory 310. In some embodiments, the second memory 310 stores requests for new wake words, as detailed above. For example, when the communication device 105A requests and new wake word, the second electronic processor 305 associates the previous word and the request together stores the association in the second memory 310. As a result of the request, the previous word, such as "Alpha", may be classified as a "disliked" word. In some embodiments, the second memory 310 may separately classify words commonly associated with specific incidents. For example, when the communication device 105 is at a fire, the second electronic processor 305 refers to words commonly used at fires stored in the second memory 310. For example, words commonly used at fires may exclude words such as, for example, "Hose", "Truck", "Flames", and the like. These words may then be avoided when the second electronic processor 305 assigns wake words to the communication devices 105.

In some embodiments, at least some of the information described above as being stored by the second memory 310 (for example, assigned wake word for the communication devices 105) may be stored in a database or other network element that is separate from the server 115 (in other words, a wake word database). In such embodiments, the separate database communicates with the server 115 over the network 110 such that the server 115 receives information stored in the separate database.

As noted previously herein, when multiple communication devices 105 are in close proximity to one another (for example, within a range in which sound generated by a person speaking will reach a microphone, for example, 20 feet) and are activated via wake words, a wake word intended for the first communication device 105A may inadvertently trigger the second communication device 105B. Accordingly, each of the communication devices 105A through 105G, when present at the same incident, may require a unique wake word that is not shared with another communication device 105. Additionally, public safety and similar incidents often relate to specific scenarios, include varying levels of background noise, occur during specific weather events, and otherwise may have particular characteristics. Based on the scenario, background noise, weather and/or other characteristics, it may be desirable to avoid having specific words relevant to the incident as wake words.

Figure 4:
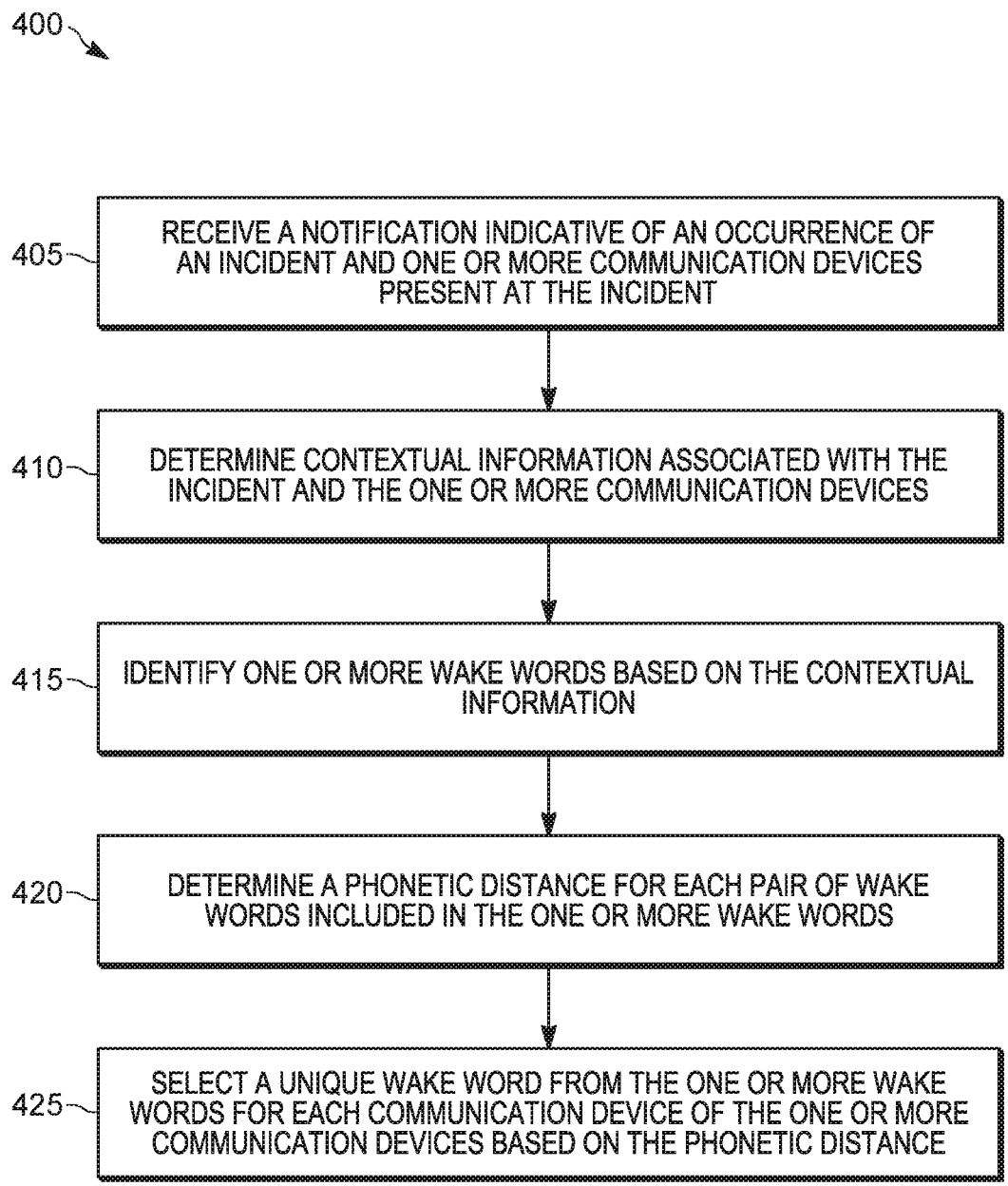
FIG. 4 is a flowchart of a method of selecting wake words for one or more communication devices in accordance with some embodiments.

Accordingly, to provide each communication device 105 with a unique wake word, the server 115 may perform a method 400 illustrated in FIG. 4. The method 400 is used to monitor devices assigned at an incident and provide each device with a unique wake word, while accounting for various contextual factors.

FIG. 4 illustrates the example method 400 of selecting wake words for one or more communication devices. The method 400 is described as being executed by the server 115 and, in particular, by the second electronic processor 305. However, in some embodiments, the method 400 is performed by another device (for example, another computer or one of the communication devices 105).

At block 405, the second electronic processor 305 receives a notification indicative of an occurrence of an incident and one or more communication devices present at the incident. For example, the second electronic processor 305 receives an input from a dispatcher indicative of a location and type of incident. The dispatcher may manually input the location and type of incident into an input device of the server 115, for example by entering text via a keyboard or entering voice instructions via a microphone. In some embodiments, the notification is transmitted by a communication device 105 present at the incident. The notification transmitted by the communication device 105 may further include the location of the communication device 105 indicated by a present location of a global positioning system (GPS) device included in the communication device 105, a location input by a user of the communication device 105, or the like. The type of incident may be, for example, a robbery, a fire, a shooting, a traffic incident, or the like.

In some embodiments, the type of incident is determined by the first electronic processor 205 of the communication device 105. For example, the first electronic processor 205 may analyze background noise and words received by the microphone 225. Background noise, such as honking cars, may indicate a traffic incident has occurred. Alternatively, hearing people in the background, or the user of the communication device 105, use words such as "fire" or "flames" may indicate the incident is a fire.

At block 410, the second electronic processor 305 determines contextual information associated with the incident and the one or more communication devices. The contextual information may include at least one selected from a group consisting of a desired number of wake words, a number of communication devices 105 present at the incident, a communication device user role type, an incident background noise, an incident type, a weather condition, an ambient interference, a communication device user history, a vernacular based on the incident type, a communication device historical preference, a predetermined list of wake words associated with a communication device, a list of wake words in use, or the like.

In some embodiments, the contextual information includes a number of communication devices 105 present at the incident. For example, the first communication device 105A, the second communication device 105B, the third communication device 105C, and the fourth communication device 105D may be present at the incident. However, more or fewer communication devices 105 may be present at the incident. In some embodiments, no communication device 105 may be present at the incident. The contextual information may include a number of communication devices 105 requested by a commanding officer to be assigned to the incident. For example, a commanding officer may request for the first communication device 105A and the second communication device 105B to be assigned to the incident. Although these devices are not yet present at the incident, they will be present at the incident at a future period of time.

In some embodiments, the contextual information includes a desired number of wake words. For example, if the first communication device 105A and the second communication device 105B are both assigned to the incident, they both may need an assigned wake word. However, if the first communication device 105A was recently at a separate second incident prior to the first incident, the first communication device 105A may already be assigned a wake word. In this case, only the second communication device 105B requires a wake word. In some embodiments, the incident may include a different number of devices that require a wake word. In some embodiments, the contextual information includes a list of words already in use at the incident. For example, the first communication device 105A may already be assigned the word "Alpha".

In some embodiments, the contextual information includes a communication device user role type. The communication device user role type may be, for example, a police officer, a firefighter, an emergency medical situation (EMS) worker, or the like. The communication device user role type may be assigned to the communication device 105 via an internal setting. In some embodiments, a user of the communication device 105 may establish the communication device user role type upon receiving the communication device 105. In some embodiments, the communication device user role type is a permanent setting of the communication device 105.

In some embodiments, the contextual information includes an incident type. As previously discussed above, the incident type may include, for example, a robbery, a fire, a shooting, a traffic incident, or the like. In some embodiments, the contextual information may include an incident type vernacular, or a set of words commonly used at a specific incident type. For example, during an emergency medical incident, the incident type vernacular, or vernacular set, may include ["Doctor", "Syringe", "Emergency", "Ambulance", "Blood", "IV", . . . ] and the like. During a traffic incident, the incident type vernacular may include ["Car", "Crash", "Traffic", "Bumper", . . . ] and the like.

In some embodiments, the contextual information includes an ambient interference experienced by the communication device 105. In some embodiments, determining contextual information associated with the incident and the one or more communication devices further comprising calculating an ambient interference based on at least one selected from a group consisting of a historical incident ambient noise, a detected ambient noise, and a current weather condition. The ambient interference may include, for example, an incident background noise experienced by the communication device 105. If the incident is a traffic incident, the background noise may include, for example, honking cars, wind, talking bypassers, and the like. If the incident is a fire, the background noise may include spraying water, falling construction or other materials, burning objects, and the like. In some embodiments, the ambient interference may include a weather condition. Weather conditions may include, for example, wind, rain, lightning, and the like. Historical incident ambient noise may include, for example, a typical volume of background noise for a specified incident type.

In some embodiments, the contextual information includes a communication device user history. Communication device user history (e.g., a communication device historical preference) may be, for example, wake words the user of the communication device 105 historically dislikes, wake words that historically result in the user of the communication device 105 requesting a new wake word, or the like. In some embodiments, the communication device user history includes a list of user preferences stored in the first memory 210. In some embodiments, the communication device user history also includes a predetermined list of wake words associated with the communication device 105. For example, the user of the communication device 105 may store a list of preferred wake words, a list of words with a history of success, a list of words with high accuracy for the user of the communication device 105, or the like.

Figure 5:
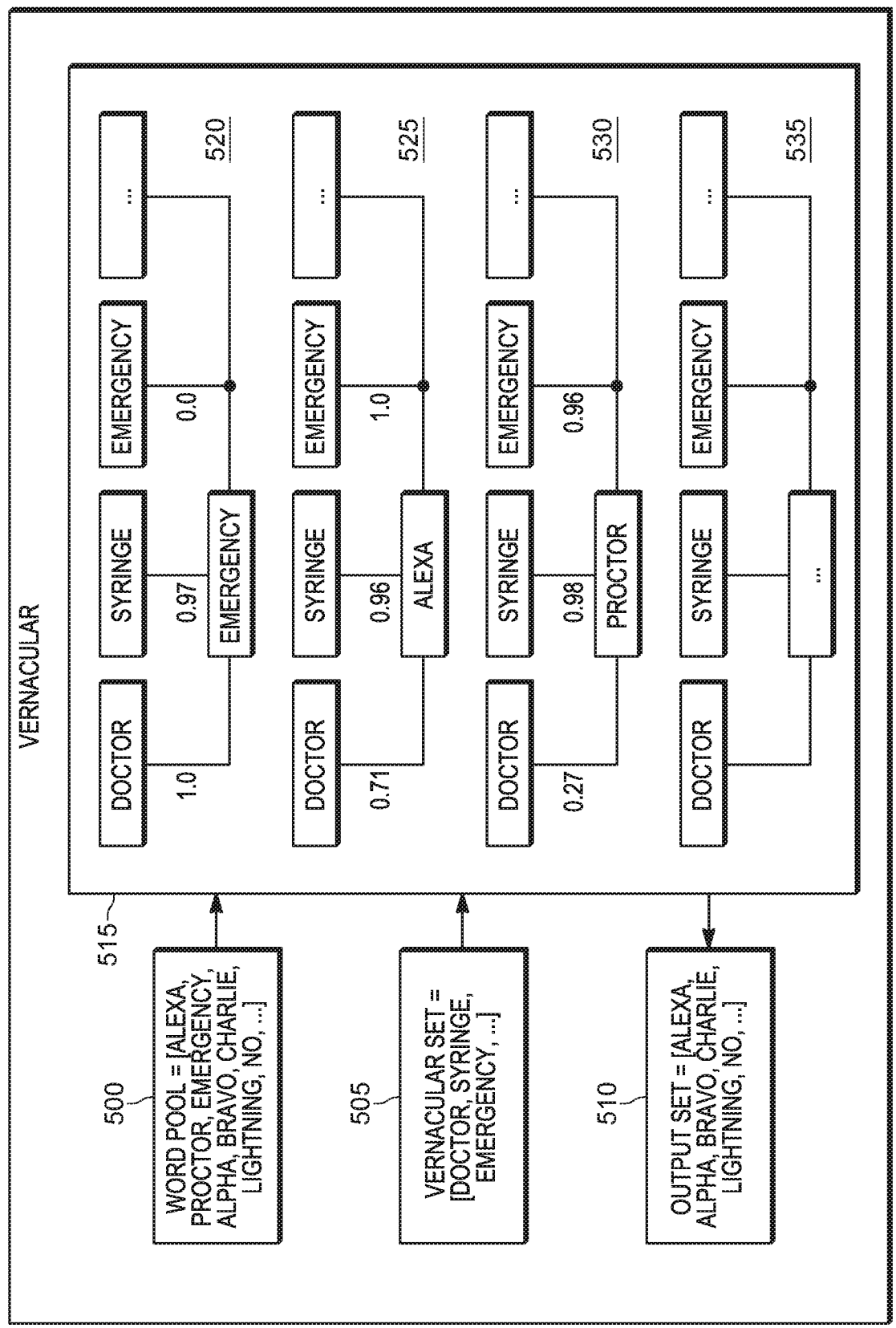
FIG. 5 is a block diagram of determining the phonetic distance between a plurality of sets of words in accordance with some embodiments.
Figure 6:
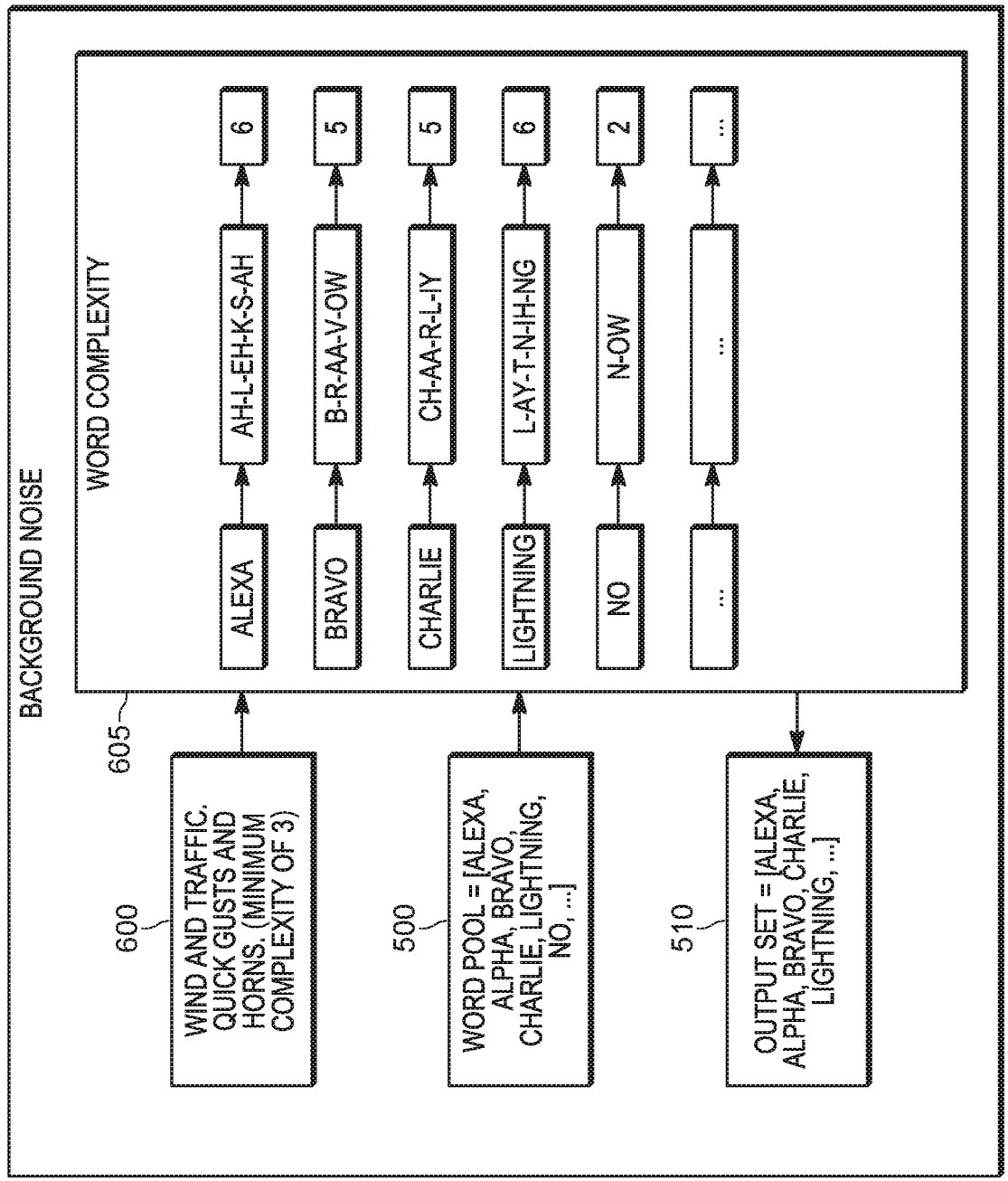
FIG. 6 is a block diagram of determining the complexity of a set of words in accordance with some embodiments.
Figure 7:
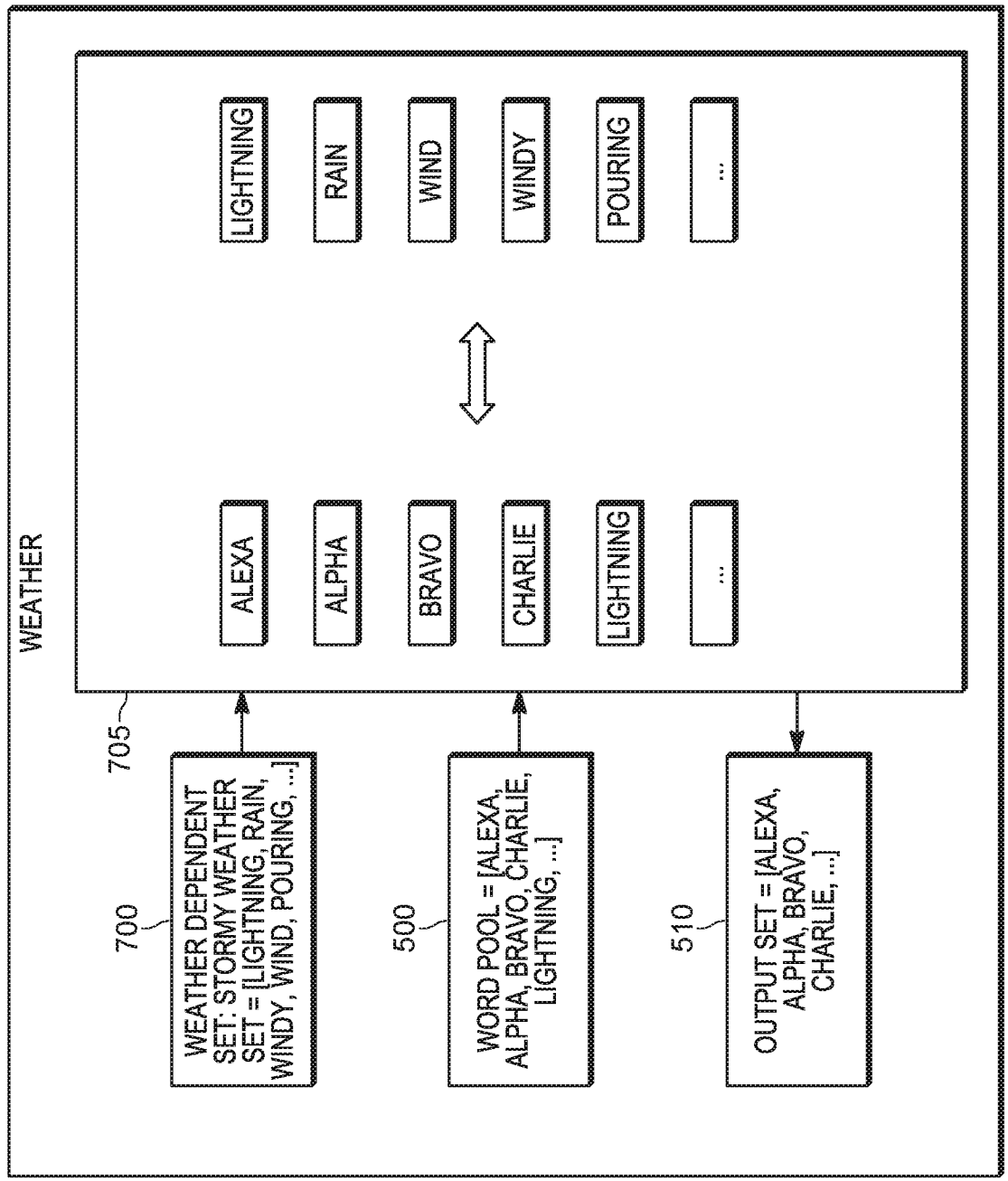
FIG. 7 is a block diagram of comparing a plurality of sets of words in accordance with some embodiments.

At block 415, the second electronic processor 305 identifies one or more wake words based on the contextual information. For example, FIG. 5 illustrates a block diagram of determining the phonetic distance between a plurality of sets of words. Specifically, FIG. 5 illustrates determining a phonetic distance between an initial large pool of potential wake words and an incident type vernacular set of words. A word pool 500 includes an initial set of wake words, such as ["Alexa", "Proctor", "Emergency", "Alpha", "Bravo", "Charlie", "Lighting", "No", . . . ] and the like. In other embodiments, the word pool 500 includes other words not included in the provided example. A vernacular set 505 includes a set of vernacular-specific words, such as ["Doctor", "Syringe", "Emergency", . . . ] and the like. Although the vernacular set 505 is shown as using emergency medical situation-specific words, other incident types may include their own specific vernacular set 505. Additionally, an output set 510 includes a set of words in which the phonetic distance exceeds a phonetic distance threshold. For example, a word in the word pool 500 may need a phonetic distance of at least 0.5 when compared to each word in the vernacular set 505 to be added to the output set 510. In this example, the phonetic distance threshold is also 0.5.

The word pool 500 and the vernacular set 505 are fed into the phonetic processor 515, which may be the first electronic processor 205, the second electronic processor 305, or another processor configured to perform the same actions as the phonetic processor 515. The phonetic processor 515 is configured to determine the phonetic distance between each word in the word pool 500 against each word in the vernacular set 505. For example, in example 520 in FIG. 5, the word "Emergency" from the word pool 500 is compared against each word from the vernacular set 505. "Emergency" and "Doctor" have a determined phonetic distance of 1.0, "Emergency" and "Syringe" have a determined phonetic distance of 0.97, and "Emergency" and "Emergency" have a phonetic distance of 0.0, meaning they are the same word, and "Emergency" is present in both the word pool 500 and the vernacular set 505. The comparison continues for each words present in the vernacular set 505. Each phonetic distance is then compared to a phonetic distance threshold. In some embodiments, "Emergency" is then added to a failure set (not shown) of words, the failure set including words that do not exceed the phonetic distance threshold.

In example 525, the word "Alexa" from the word pool 500 is compared against each word from the vernacular set 505. "Alexa" and "Doctor" have a phonetic distance of 0.71, "Alexa" and "Syringe" have a phonetic distance of 0.96, and "Alexa" and "Emergency" have a phonetic distance of 1.0. Each phonetic distance is then compared to a phonetic distance threshold. In this example, each phonetic distance value is above the phonetic distance threshold, and "Alexa" is added to the output set 510.

In example 530, the word "Proctor" from the word pool 500 is compared against each word from the vernacular set 505. "Proctor" and "Doctor" have a phonetic distance of 0.27, "Proctor" and "Syringe" have a phonetic distance of 0.98, and "Proctor" and "Emergency" have a phonetic distance of 0.96. Each phonetic distance is then compared to a phonetic distance threshold. In this example, "Proctor" and "Doctor" have a phonetic distance value below the phonetic distance threshold, and "Proctor" is added to the failure set of words that do not exceed the phonetic distance threshold.

This process continues for each word in the word pool 500, as shown by example 535.

In some embodiments, identifying one or more wake words based on the contextual information includes determining a complexity of each word in the word pool 500. The word pool 500 may be, for example, the output set 510 from the previous example, the initial word pool, or a separate word pool. For example, based on the determined ambient interference, such as background noise, weather, and the like present at the incident, a minimum complexity threshold 600 may be determined by the second electronic processor 305 to be compared to a complexity value of each wake word in the word pool 500. For example, if the ambient interference includes wind and traffic, the minimum complexity threshold 600 may be determined to be 3. The word pool 500 and the minimum complexity threshold 600 are fed into a complexity processor 605, which may be the first electronic processor 205, the second electronic processor 305, or another processor configured to perform the same actions as the complexity processor 605.

The complexity processor 605 determines a complexity value for each word in the word pool 500. The complexity value may be determined, for example, based on a number of syllables in each word, a number of letters in each word, a number of sounds in each word, or the like. For example, "Alexa" is broken down into "Ah-L-Eh-K-S-Ah," which has 6 sounds, resulting in a complexity value of 6. "Bravo" is broken down into "B-R-Aa-V-Ow," which has 5 sounds, resulting in a complexity value of 5. "Charlie" is broken down into "Ch-Aa-R-L-Iy," which has 5 sounds, resulting in a complexity value of 5. "Lightning" is broken down into "L-Ay-T-n-Ih-ng," which has 6 sounds, resulting in a complexity value of 6. "No" is broken down into "N-Ow," which has 2 sounds, resulting in a complexity value of 2. This process is repeated for each word in the word pool 500.

The determined complexity value of each word is then compared to the minimum complexity threshold 600. For example, "Alexa" has a complexity value of 6, and the minimum complexity threshold 600 has a value of 3, so Alexa has a complexity greater than the minimum complexity threshold 600. Alexa is then added to the output set 510. "No", however, has a complexity value of 2, and fails to meet the minimum complexity threshold 600. Accordingly, "No" is omitted from the output set 510. In some embodiments, "No" is added to a failure set of words that fail to meet the minimum complexity threshold 600.

In some embodiments, identifying one or more wake words based on the contextual information includes comparing each word in the word pool 500 to a weather dependent set 700. The word pool 500 may be, for example, the output set 510 from the previous example, the initial word pool, or a separate word pool. The weather dependent set 700 includes words depending on the weather present at the incident. For example, if the incident includes stormy weather, the weather dependent set 700 may include words such as ["Lightning", "Rain", "Windy", "Wind", "Pouring", . . . ] and the like.

The word pool 500 and the weather dependent set 700 are fed into the comparison processor 705, which may be the first electronic processor 205, the second electronic processor 305, or another processor configured to perform the same actions as the comparison processor 705. The comparison processor 705 compares each word in the word pool 500 to each word in the weather dependent set 700. If a word is present in each set, such as "Lightning" in the provided example, the word is removed from the output set 510. Each word in the word pool 500 that is not in the weather dependent set 700 is added to the output set 510. In some embodiments, words present in both the word pool 500 and the weather dependent set 700 are added to a failure set of words.

In some embodiments, identifying one or more wake words based on the contextual information includes determining wake words included in the predetermined list of wake words associated with communication device 105. As previously discussed, a user of the communication device 105 may maintain a list of preferred wake words. These words may be added to the output set 510. In some embodiments, identifying one or more wake words based on the contextual information further includes identifying one or more wake words based on the set of words in use at the incident and the role type of each of the communication devices. For example, the words "Alpha" and "Delta" may already be in use at the incident. Accordingly, these words would not be included in the output set 510. Additionally, the role type, such as police officer, a firefighter, an emergency worker, or the like, may include a role type vernacular, such as the vernacular set 505.

Figure 8:
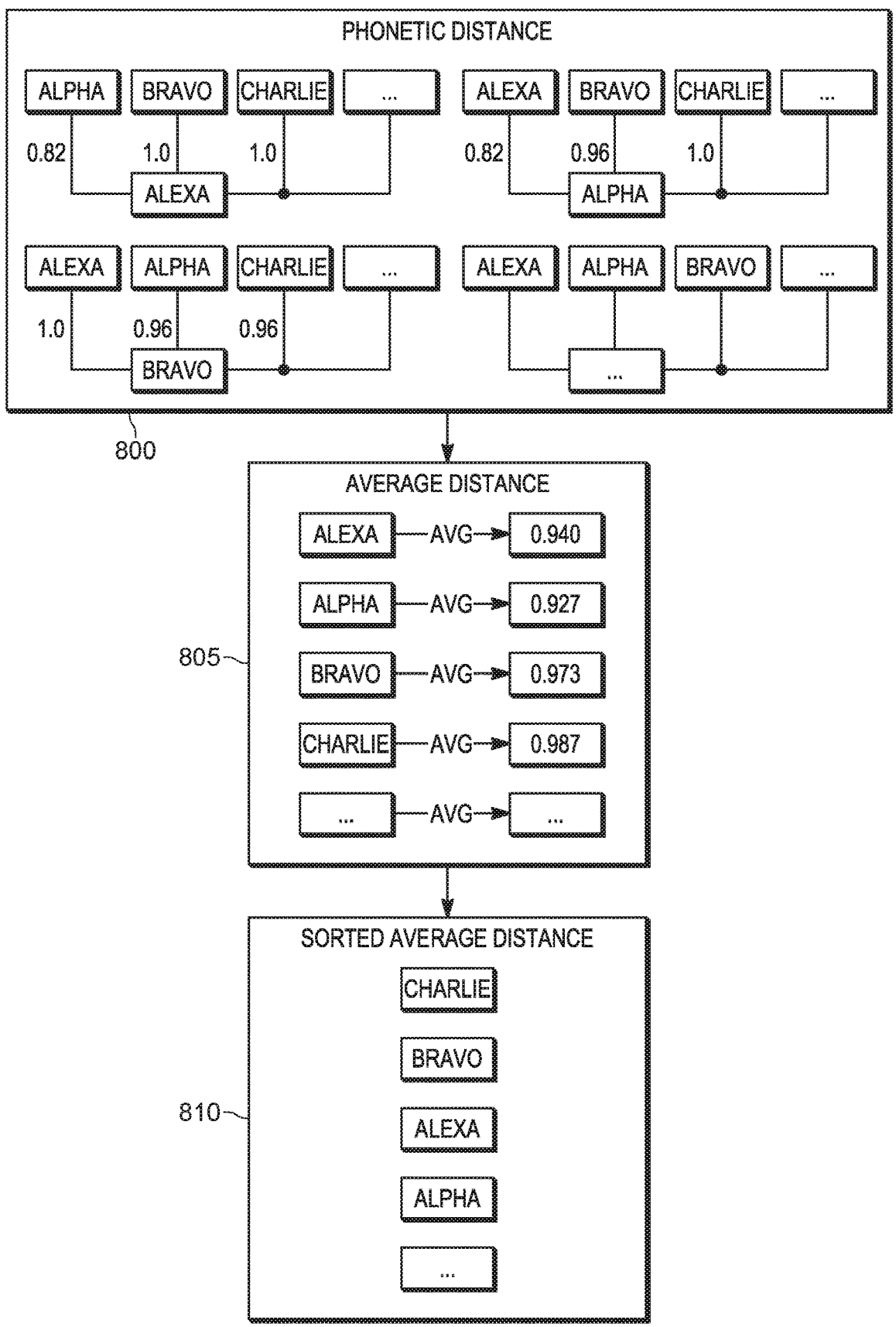
FIG. 8 is a block diagram of determining an average phonetic distance between words included in a set of words in accordance with some embodiments.

Returning to FIG. 4, at block 420, the second electronic processor 305 determines a phonetic distance for each pair of wake words included in the one or more wake words. For example, the output set 510 may include the one or more wake words based on the contextual information. FIG. 8, for example, provides a method for determining an average phonetic distance between words included in a set of words, according to some embodiments.

At block 800, each word in the output set 510 is compared to every other word in the output set 510. The output set 510 may include words such as, for example, ["Alexa", "Alpha", "Bravo", "Charlie", . . . ] and the like. For example, "Alexa" and "Alpha" have a phonetic distance of 0.82, "Alexa" and "Bravo" have a phonetic distance of 1.0, and "Alexa" and "Charlie" have a phonetic distance of 1.0. This is continued for each word in the output set 510. For example, "Alpha" is then compared to "Alexa", "Bravo", and "Charlie".

At block 805, the average phonetic distance of each word is determined. For example, "Alexa" had phonetic distance values of 0.82, 1.0, and 1.0, as determined above. These when added, and divided by the number of comparisons, results in an average phonetic distance of 0.94. The average is determined for each wake word in the one or more wake words included in the output set 510.

At block 810, the one or more wake words in the output set 510 are sorted based on the determined average phonetic distance. For example, the words may be ordered from highest average phonetic distance to lowest average phonetic distance, such as "Charlie", "Bravo", "Alexa", and "Alpha".

Returning to FIG. 4, at block 425, the second electronic processor 305 selects a unique wake word from the one or more wake words for each communication device 105 of the one or more communication devices 105 based on the phonetic distance. For example, the second electronic processor 305 may assign wake words based on how they were sorted in block 810. For example, if the first communication device 105A and the second communication device 105B are at the incident, and neither has a wake word, the second electronic processor 305 may assign "Charlie" to the first communication device 105A and "Bravo" to the second communication device 105B. In another example, the first communication device 105A, the second communication device 105B, and the third communication device 105C are present at the incident. The second electronic processor 305 may assign "Charlie" to the first communication device 105A, "Bravo" to the second communication device 105B, and "Alexa" to the third communication device 105C. In some embodiments, the third communication device 105C may already be assigned the wake word "Bravo". Accordingly, the second electronic processor 305 assigns "Charlie" to the first communication device 105A, skips over "Bravo", and assigns "Alexa" to the second communication device 105B.

In some embodiments, the second electronic processor 305 is further configured to assign a priority value to each wake word included in the one or more wake words based on a historical data associated with the one or more wake words, and select a unique wake word from the one or more wake words for each communication device 105 of the one or more communication devices 105 based on the priority value. Priority values may be, for example, numerical values determined based on the determined phonetic distance or a user historical preference. For example, as described above, a user may indicate a dislike for a wake word included in the one or more wake words. The second electronic processor 305 may assign a lower priority value for words that the user dislikes. Accordingly, even if "Charlie" has the greatest phonetic distance, if the user has indicated a dislike for "Charlie", "Bravo" may be assigned instead.

In some embodiments, the second electronic processor 305 is further configured to provide, with an output device of each of the one or more communication devices, the unique wake word. The output device of communication device 105 may be, for example, speaker 230, the display 220, or a haptic device. In some embodiments, the second electronic processor 305 is further configured to receive a request for a second unique wake word and store the request with the communication device historical preference. Upon providing the unique wake word with an output device, the second electronic processor 305 may also provide an option on the display 220 to request a second unique wake word. For example, "Lightning" may be provided to a user of the communication device 105. The user may select the option to request a second unique wake word. The communication device 105 then provides the second unique wake word, such as "Charlie". In some embodiments, the user may request a second unique wake word by pushing a button on the communication device 105, by giving a verbal request to the microphone 225, or the like.

The request for the second unique wake word is then stored with the communication device historical preference. For example, a list of words that have resulted in a request for a second unique wake word for the communication device 105 may be stored in the first memory 210, the second memory 310, or the like. In some embodiments, the first memory 210 or the second memory 310 may include a list of words that have resulted in a request for a second unique wake word for the current user of the communication device 105.

In some embodiments, the second electronic processor 305 is further configured to provide, with an output device of each of the one or more communication devices, an option indicating a request for a new wake word. For example, the option to select a new wake word may be sent to each communication device 105A through 105G. The second electronic processor 305 is further configured to receive the request for a new wake word from at least one communication device. For example, the fourth communication device 105D may transmit a request for a new wake word. Any number of communication devices 105A through 105G may transmit this request. The second electronic processor 305 is further configure to select a second unique wake word for at least one communication device 105 based on the request and the determined phonetic distance. For example, if the fourth communication device 105D requests a new wake word, the second electronic processor 305 refers to the list of sorted wake words from block 810. The second electronic processor 305 selects the wake word with the highest average distance that is not currently assigned to a communication device 105. The second electronic processor 305 is further configured to provide, with an output device of the at least one communication device, the second unique wake word, as detailed above.

In some embodiments, the wake word assigned to communication device 105 expires upon completion of the incident. For example, once the fire is put out and all communication devices 105 exit the incident, the wake words are unassigned and are available to be reassigned. In some embodiments, if a communication device 105 leaves an incident prior to completion of the incident, the assigned wake word is unassigned from the communication device 105.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, it should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
   a transceiver;
   a memory storing a plurality of wake words; and
   an electronic processor communicatively coupled to the transceiver and the memory, the electronic processor configured to:
      receive a notification indicative of an occurrence of an incident and a plurality of communication devices present at the incident;
      determine contextual information associated with the incident and the plurality of communication devices;
      determine a subset of wake words from the plurality of wake words based on the contextual information;
      determine a phonetic distance for each wake word with respect to each of the other wake words included in the subset of wake words; and
      assign a unique wake word from the subset of wake words to each communication device of the plurality of communication devices based on the determined phonetic distance.

2. The electronic computing device of claim 1, wherein the contextual information includes a communication device historical preference.

3. The electronic computing device of claim 2, wherein the electronic processor is further configured to:
   receive a request for a second unique wake word; and
   store the request with the communication device historical preference.

4. The electronic computing device of claim 1, wherein the contextual information includes at least one selected from a group consisting of a desired number of wake words, a communication device user role type, an incident background noise, an incident type, a communication device user history, a weather condition, and a vernacular based on the incident type.

5. The electronic computing device of claim 1, wherein the contextual information further includes a predetermined list of wake words associated with a communication device of the plurality of communication devices.

6. The electronic computing device of claim 1, wherein the electronic processor is further configured to:
   assign a priority value to each wake word included in the subset of wake words based on a historical data associated with the subset of wake words; and
   assign a unique wake word from the subset of wake words to each communication device of the plurality of communication devices based on the priority value.

7. The electronic computing device of claim 1, wherein determining the subset of wake words from the plurality of wake words based on the contextual information further includes determining the subset of wake words based on a set of words in use at the incident and the role type of each of the communication devices.

8. The electronic computing device of claim 1, wherein the electronic processor is further configured to:
   provide, with an output device of each of the plurality of communication devices, the unique wake word.

9. The electronic computing device of claim 1, wherein the electronic processor is further configured to:
provide, with an output device of each of the plurality of communication devices, an option indicating a request for a new wake word;
receive the request for a new wake word from at least one communication device;
assign a second unique wake word to at least one communication device based on the request and the determined phonetic distance; and
provide, with an output device of the at least one communication device, the second unique wake word.

10. The electronic computing device of claim 1, wherein determining contextual information associated with the incident and the plurality of communication devices further comprises calculating an ambient interference based at least on one selected from a group consisting of a historical incident ambient noise, a detected ambient noise, and a current weather condition.

11. A method of determining a wake word, the method comprising:
receiving, with an electronic processor, a notification indicative of an occurrence of an incident and a plurality of communication devices present at the incident;
determining, with the electronic processor, contextual information associated with the incident and the plurality of communication devices;
determining, with the electronic processor, a subset of wake words from a plurality of wake words based on the contextual information, wherein the plurality of wake words are stored in a memory connected to the electronic processor;
determining, with the electronic processor, a phonetic distance for each wake word with respect to each of the other wake words included in the subset of wake words; and
assigning a unique wake word from the subset of wake words to each communication device of the plurality of communication devices based on the determined phonetic distance.

12. The method of claim 11, wherein the contextual information includes a communication device historical preference.

13. The method of claim 12, further comprising:
receiving, with the electronic processor, a request for a second unique wake word; and
storing, with the electronic processor, the request for the communication device historical preference.

14. The method of claim 11, wherein the contextual information includes at least one selected from the group consisting of a desired number of wake words, a communication device user role type, an incident background noise, an incident type, a communication device user history, a weather condition, and a vernacular based on the incident type.

15. The method of claim 11, wherein the contextual information further includes a predetermined list of wake words associated with a communication device of the plurality of communication devices.

16. The method of claim 11, further comprising:
assigning a priority value to each wake word included in the subset of wake words based on a historical data associated with the subset of wake words; and
assigning a unique wake word from the subset of wake words to each communication device of the plurality of communication devices based on the priority value.

17. The method of claim 11, wherein determining the subset of wake words from the plurality of wake words based on the contextual information further includes determining the subset of wake words based on a set of words in use at the incident and the role type of each of the communication devices.

18. The method of claim 11, further comprising:
providing, with an output device of each of the plurality of communication devices, the unique wake word.

19. The method of claim 11, further comprising:
providing, with an output device of each of the plurality of communication devices, an option indicating a request for a new wake word;
receiving, with the electronic processor, the request for a new wake word from at least one communication device;
assigning, with the electronic processor, a second unique wake word to at least one communication device based on the request and the determined phonetic distance; and
providing, with the output device of the at least one communication device, the second unique wake word.

20. The method of claim 11, wherein determining, with the electronic processor, contextual information associated with the incident and the plurality of communication devices further comprises calculating an ambient interference based at least on one selected from a group consisting of a historical incident ambient noise, a detected ambient noise, and a current weather condition.

* * * * *